United States Patent [19]

McKown

[11] Patent Number: 4,826,103

[45] Date of Patent: May 2, 1989

[54] ACTIVE CABLE-CUTTING ASSEMBLY FOR AIRCRAFT

[75] Inventor: James M. McKown, Roe, Ark.

[73] Assignee: Custom Air, Inc., Roe, Ark.

[21] Appl. No.: 43,683

[22] Filed: Apr. 28, 1987

[51] Int. Cl.$^4$ .............................................. B64D 45/00
[52] U.S. Cl. ..................................... 244/1 R; 89/1.14; 83/639; 83/580; 30/180; 30/DIG. 4; 114/221 A; 244/17.11; 244/121
[58] Field of Search ................. 244/1 R, 17.11, 129.1, 244/121; 89/1.14, 33.01; 83/66, 597, 605, DIG. 1, 639, 16, 170, 390, 926 B, 37, 362, 370, 580, 658; 30/278, 92, 277, 180, DIG. 4, 361, 123, 296, 315

[56] References Cited

U.S. PATENT DOCUMENTS

| | | | |
|---|---|---|---|
| 1,304,549 | 5/1919 | DuPont | 114/221 A |
| 1,403,492 | 1/1922 | Erkhoff | 89/151 |
| 1,915,435 | 6/1933 | Miller | 114/221 A |
| 2,335,952 | 12/1943 | Martin | 114/221 A |
| 2,391,757 | 12/1945 | Vesely | 89/151 |
| 2,446,994 | 8/1948 | Barker | 89/1.14 |
| 3,326,172 | 6/1967 | Kish | 114/221 A |
| 3,915,043 | 10/1975 | Smith et al. | 114/221 A |
| 4,215,833 | 8/1980 | Chan . | |
| 4,407,467 | 10/1983 | Emigh et al. | 114/221 A |

Primary Examiner—Galen Barefoot
Attorney, Agent, or Firm—Stephen D. Carver

[57] ABSTRACT

An active, automatic-firing, impact responsive cable-cutting apparatus for use on conventional aircraft such as helicopters for virtually instantaneously forcibly severing obstructive cables. A lightweight, non-corrosive frame comprising a mounting base portion and an integral, outwardly extending, angular deflection arm is adapted to be selectively mounted on an aircraft or on an extension pole which extends downwardly toward the ground or forward of the nose of the aircraft. Mechanical firing components of the assembly are housed within a cylindrical sleeve adapted to be accessed for maintenance through a removable butt. Sharpened, serrated guide blades extending along outwardly angled forward edges of the frame are adapted to strain the outer periphery of a cable as it is forcibly deflected and guided into a central mouth. A removable cutting block is provided at the interior of the apparatus adjacent the cutting assembly mouth in operative association with a rigid, angular, cutter knife. The pivotally mounted cutter knife may be selectively tensioned and operationally defines a cutting angle suitable to engage cables of a wide range of thicknesses. Impacted cables are forcibly severed when the cutter knife is lowered adjacent to the surface of the cutting block in response to activation of an associated firing mechanism, which virtually instantaneously detonates the cutting jaws to sever the offensive cable in a scissors-like motion. Alternative embodiments include a semi-automatic self loading version having an operative cartridge magazine, and a winged version adapted to be mounted upon a rigid extension pole or cable for offensive cable removal.

15 Claims, 6 Drawing Sheets

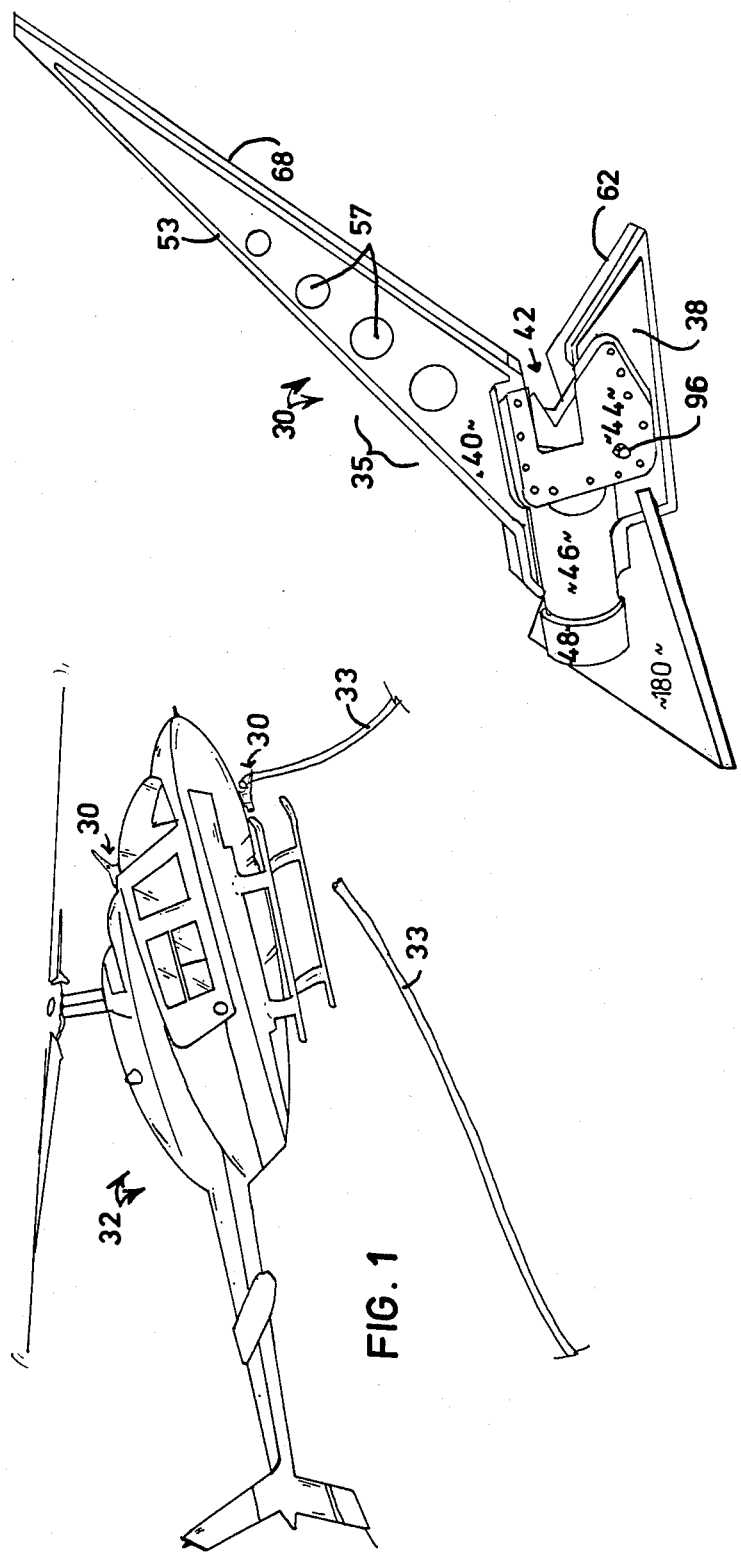

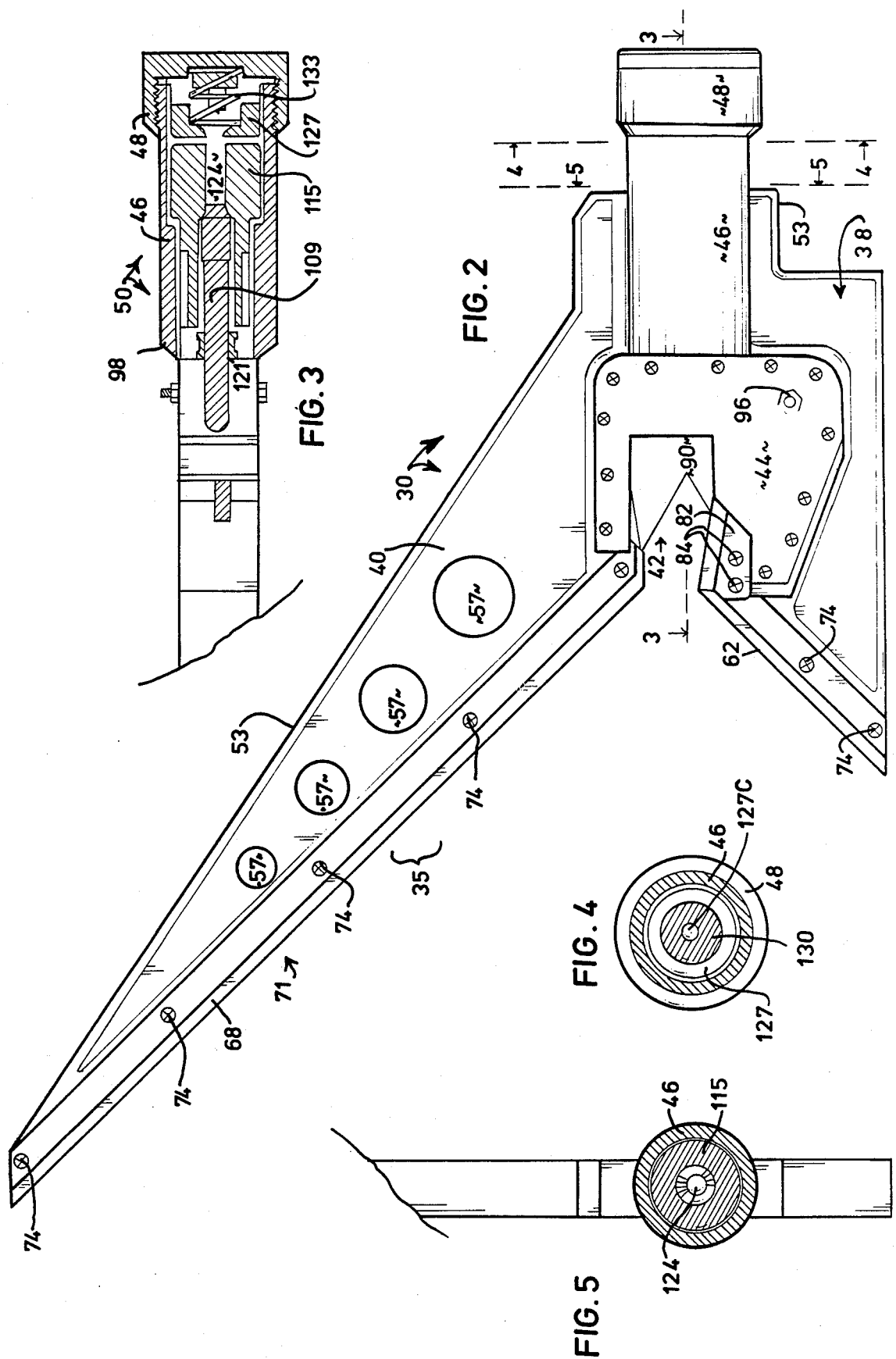

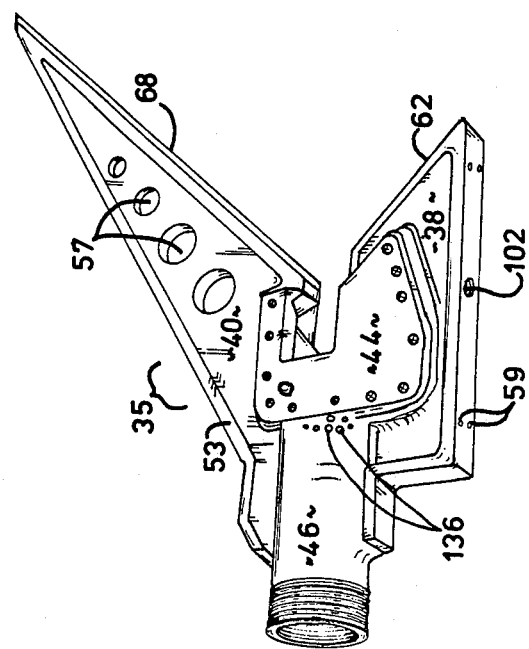
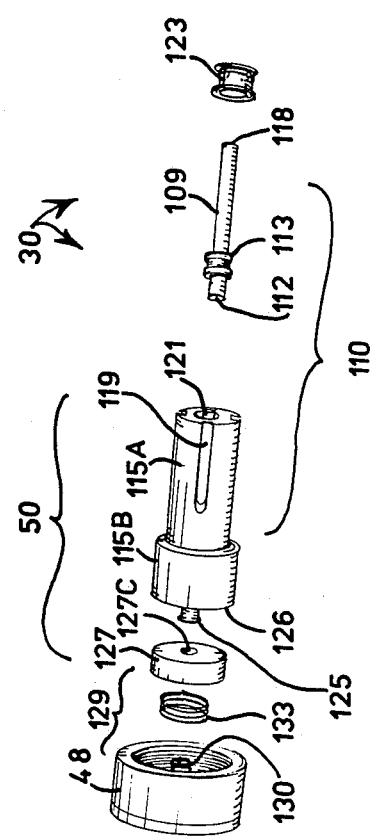
FIG. 6

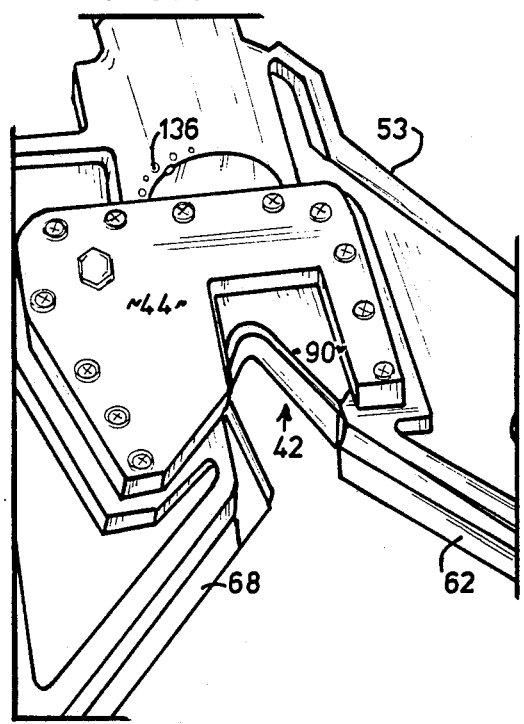
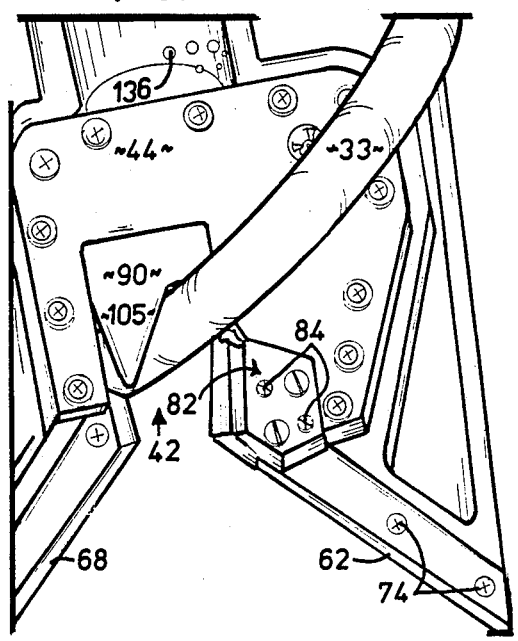
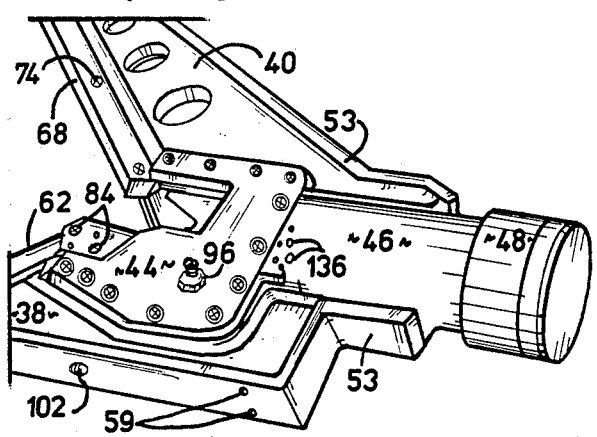
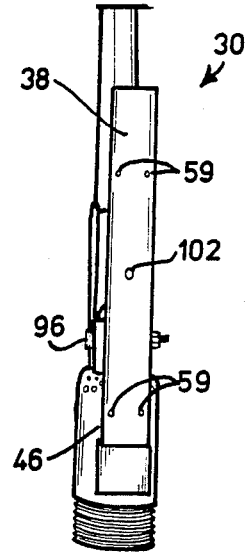

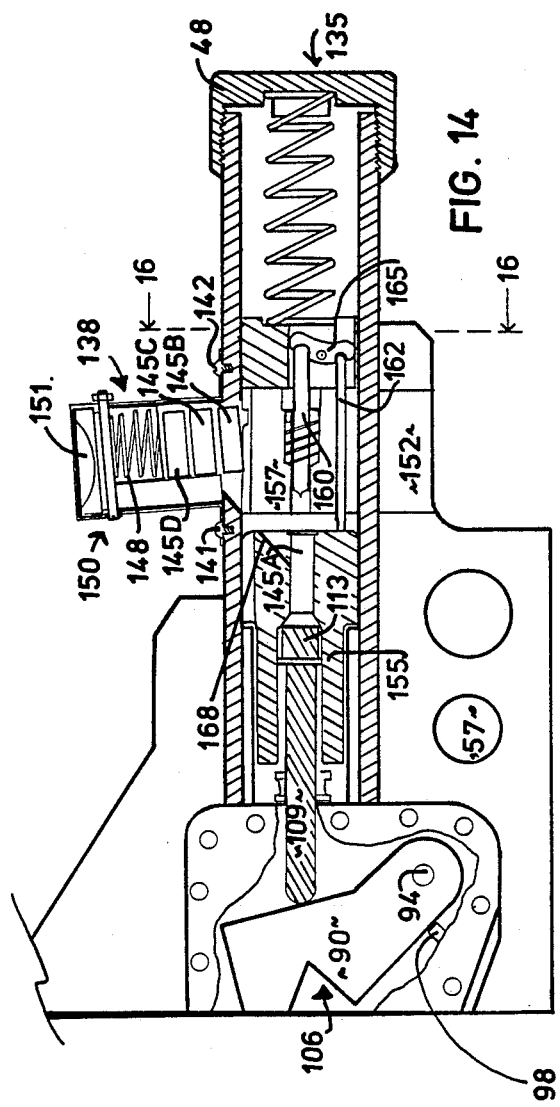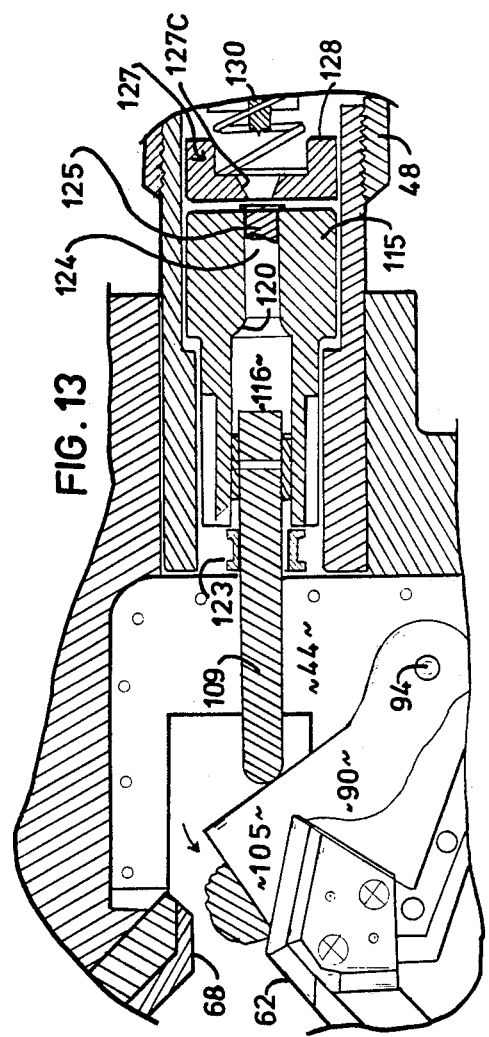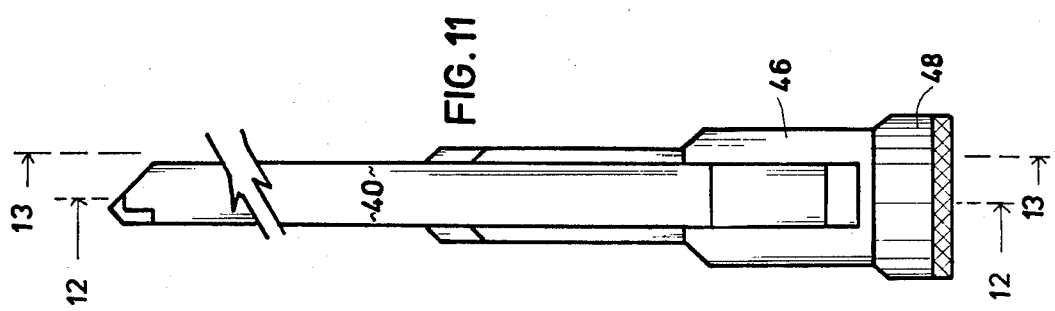

ACTIVE CABLE-CUTTING ASSEMBLY FOR AIRCRAFT

BACKGROUND OF THE INVENTION

The present invention relates generally to cable-cutting devices adapted for use with low-flying aircraft such as cropdusters, helicopters, or the like. More specifically, the present invention relates to an active, automatic-fire, cable cutting device adapted to be associated with an aircraft to prevent damage typically resulting from entanglement with above-ground cables. It is believed that the invention is properly classified in U.S. Class 244, subclass 121.

As will be appreciated by experienced pilots, the safe operation of low-flying aircraft used, for example, for agricultural applications or tactical low-level (NOE) maneuvers, is deleteriously complicated by the existence of numerous above-ground power lines or cables. My investigations reveal that approximately eight percent of commercial helicopter accidents occur as a result of collisions with conventional power cables, while up to thirty percent of reported agricultural collisions are caused by cable strikes. Further, thirty-five percent of military aircraft are grounded by cable strikes occurring during NOE flights.

Helicopters are particularly vulnerable to damage from such cables since the rotor mast extends up a significant distance beyond the airframe structure of the aircraft, and critical control mechanisms for such aircraft are operationally associated with the rotor mast. Approximately fifty percent of all aeromedical helicopter accidents, for example, are attributed to such cable strikes, which in 1985 and 1986 accounted for an average of twelve injuries per one hundred thousand flight hours.

A low-flying aircraft which strikes a typical cable in tension may, on occasion, break the cable by the mere force of its impact and thus escape damage. However, conventional power cables are typically strung with a predetermined amount of slack to prevent breakage due to wire fatigue or excessive vibration in response to air turbulence.

By way of example, a one-inch cable strung 1,150 feet between vertical support structures typically exhibits forty five feet of slack. If an OH6 light military helicopter struck such a cable at a speed of 50 knots, and the cable was not immediately broken or cut, the aircraft would be dramatically decelerated to an abrupt halt (zero airspeed) before the aircraft advanced sufficiently to remove all the slack in the cable. If the cable is not broken upon impact, as is often the case with conventional cable cutters, it may cause the aircraft to change direction and become entangled in additional surrounding cables or drag the aircraft to the ground. Additionally, surrounding cables may become entangled in the rotor blades or about the rotor mast and thus cause extensive damage to the aircraft control systems.

Hence it is desirable to provide low-flying aircraft with a system for removing above-ground cables which threaten the safe operation of the aircraft. In the prior art, safety devices for the deflection or cutting of such cables have been proposed. The prior art cable cutting device disclosed in U.S. Pat. No. 4,215,833 issued to Chan on Aug. 5, 1980 includes passive cable deflection means for guiding a cable between adjacent cutting edges to effectuate at least a partial cut which arguably causes the cable to fail under tension. The effectiveness of the prior art devices defined in U.S. Pat. No. 4,215,833 and in each of the prior art cutters referenced therein, however, is based entirely on kinetic energy, as expressed in the acceleration of the aircraft, and is thus limited to a narrow range of tension load and aircraft speed variables.

Known prior art systems fail where, for example, the aircraft strikes the cable at an insufficient rate of speed and/or is unable to "drag out" the slack in the cable as described above to achieve sufficient tension to effectuate a cut. If the initial impact of the cable strike breaks insulators on the power lines, the cable must be dragged an additional length to attain the tension required for a cut. No auxiliary cutting means are believed suggested in the prior art for such a case. This is particularly critical, since it is often necessary to fly at low speeds to maneuver under low visibility conditions such as may be encountered during severe weather, during night operations, or with terrain avoidance procedures.

A further shortcoming of known prior art devices is that effective use often requires that the airframe be equipped with additional reinforcing structure in order to withstand the loads transferred directly to the airframe. Of limited relevance in this regard in U.S. Pat. No. 3,362,289, issued to Guin on Jan. 9, 1968, which suggests the possible advantage of employing an extension cable or pole for operating aircraft weapons at ground level. However, the latter reference also teaches that such extensions also necessitate the addition of reinforcing and/or bracing structure.

No provision is made in the known prior art for fast-action, successive cutting where, for example, multiple cables are encountered. Chan, U.S. Pat. No. 4,215,833, expressly rejects the concept of providing active, explosion-activated cable-cutting means alleging that such devices are impractical and unsuitable because of excessive weight, complexity, and cost. Even if speed and impact force are sufficient to accomplish a first cable cut, so much acceleration would be lost in accomplishing the first cut that it would be virtually impossible for known prior art devices to properly effectuate a subsequent cut.

It is thus desirable to overcome the previously encountered difficulties and present an active cable cutting system which has been proven to be effective under a broad range of conditions, which can be effectively and economically produced, and which can be easily adapted for use with a variety of conventional aircraft. It would further seem advantageous to provide an aircraft cable cutting system designed to make optimum use of both kinetic and potential energy adapted to operate independently of variables such as airspeed, wire tension, or aircraft structural strength.

SUMMARY OF THE INVENTION

The present invention comprises an active, automatic-firing cable-cutting assembly for use on conventional aircraft, preferably helicopters, for virtually instantaneously forcibly severing impacted cables. Initial cable contact virtually instantaneously triggers an explosively driven, scissors-like cutting of the cable.

In the best mode the frame of the device, which is preferably machined of a lightweight, non-corrosive material such as an aluminum alloy, comprises a mounting base portion and an integral, outwardly extending, angular deflection arm. The frame is adapted to be selectively mounted in a variety of positions on the airframe of the aircraft or on an extension pole which extends downwardly toward the ground or forward of the nose of the aircraft. The mechanical firing components of the assembly are housed within a hollow, cylindrical sleeve adapted to be conveniently accessed by removal of a removable butt portion for loading, regular maintenance, and repair.

Elongated, sharpened guide blades preferably comprised of hardened steel alloy extend along outwardly angled forward edges of the frame and are adapted to first tear and strain the outer jacket of a cable as it is forcibly engaged within and by the cutter assembly. The guide blades tend to deflect and guide a cable into the centrally disposed mouth of the cutting assembly.

A rigid, angular, selectively removable cutting block is provided at the interior end of one of the guide blades adjacent the cutting assembly mouth, in operative association with a rigid, angular, cutter knife. The cutting block is preferably made of tool steel or of any material suitable for providing a tough, sharp, well-defined cutting surface. The cutter knife is mounted for pivotal movement and is held in position upon a spring-biased post. The cutter knife preferably defines a relatively wide cutting angle which is adapted to engage a variety of cables of differing thicknesses typically used in the United States. The cutting action accomplished by the device is in the nature of a shear, which occurs when the cutter knife is lowered adjacent to the surface of the cutting block in response to activation of an associated firing mechanism.

The assembly is preferably powered by an explosive firing mechanism comprising a standard explosive power load such as those identified by Navy Stock No. N55452-7235-0683. The explosion drives an elongated piston centered within a piston cavity within an axially displaceable combustion chamber mechanism disposed within the frame sleeve. In response to initial cable contact, the piston deflects the combustion chamber member rearwardly towards a rigid, stationary firing pin which is guided into activating contact with the explosive load. The resultant explosion radically forces the piston into driving engagement with the cutting knife of the jaws to sever the offending cable captured therewithin.

An alternative embodiment of the invention includes an elongated breech portion adapted to support a cartridge magazine. The alternative model is adapted to automatically reset and reload after an initial firing for rapid-fire succession. In the alternative embodiment, a spring-biased movable firing pin is driven by translation of impact through a rocker carriage. This arrangement is particularly advantageous when a cable is not immediately severed upon the first firing, or when additional cables are encountered in a multiple-cable strike.

A further alternative embodiment is adapted to be mounted upon a rigid extension pole or an extension cord and includes rigid wing mens for improved aerodynamic stability and protection from damage caused by impact or entanglement with low-lying barriers. The latter alternative embodiment includes quick-release means for releasing the assembly from the cable in the event the assembly becomes inextricably entangled with a barrier.

Thus it is a fundamental object of the present invention to provide a cable-cutting assembly of the character described which effectively protects a low-flying aircraft from damage otherwise caused by collisions with cables.

It is a further object of the present invention to provide a mechanical cable-cutting assembly of the nature described which automatically activates in response to nominal pressure applied by a captured cable.

Another object of the present invention is to provide a cable-cutting assembly of the character described which is adapted to cut conventional power lines and cables of a wide range of strengths and thicknesses.

A basic object of the present invention is to provide a cable-cutting assembly which is effective for use at slower flying velocities such as are required during low-visibility conditions.

A still further object of the present invention is to provide an active cable-cutting assembly which generally does not depend for its effective operation upon the variables of flying speed and relative cable tension.

Yet another object of the present invention is to provide an improved cable-cutting assembly of the nature described which is light-weight, aerodynamic, highly resistant to corrosion and strain, and cost-effective to produce.

A further object of the present invention is to provide a mechanical cable-cutting assembly of the nature described which can be easily and safely disassembled for maintenance or repair.

Another fundamental object of the present invention is to provide a cable-cutting assembly of the nature described which can be readily mounted in any of a number of selective positions upon a conventional aircraft such as a helicopter.

Yet another fundamental object of the present invention is to provide a cable-cutting assembly of the nature described which includes an automatic firing mechanism adapted to engage and fire an enclosed explosive charge to forcibly activate the cutting mechanism to sever cables of varying thicknesses.

A still further object of the present invention is to provide an automatic cable-cutting assembly of the character described which is adapted to automatically fire in rapid succession in order to cut multiple cables.

A basic object of the present invention is to provide a mechanical cable-cutting assembly of the character described which is effective for use upon a variety of aircraft, including small agricultural airplanes and helicopters.

Yet another basic object of the present invention is to provide an active cable-cutting assembly of the nature described which is adapted for mounting upon an extension cable to be dragged along at ground level by the aircraft for cutting low-lying cables which have been purposely obscured from direct view.

Still another object of the present invention is to provide a cable-cutting assembly adapted to be mounted upon an extension to be extended forward of the airframe of the aircraft to offensively destroy cables and similar wire barriers.

A further object of the present invention is to provide an active cable-cutting assembly of the nature described which includes a cutting knife and an associated cutting block which can be conveniently removed for sharpening or replacement.

Yet another object of the present invention is to provide an active cable-cutting assembly of the nature described which is adapted to be selectively positioned to fire in response to force loads of as low as 5 footpounds.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a pictorial view illustrating the best mode of my new invention in use upon a conventional helicopter;

FIG. 2 is an enlarged scale, side plan view of a preferred embodiment of the invention, the opposite side thereof essentially comprising a mirror image;

FIG. 3 is a fragmentary, longitudinal sectional view taken generally along line 3—3 of FIG. 2;

FIG. 4 is a cross-sectional view taken generally along line 4—4 of FIG. 2;

FIG. 5 is a fragmentary cross-sectional view taken generally along line 5—5 of FIG. 2;

FIG. 6 is a fragmentary, exploded, isometric view thereof;

FIG. 7 is an enlarged scale, fragmentary, perspective view illustrating the mouth of the apparatus;

FIG. 8 is an enlarged scale, fragmentary, perspective view thereof;

FIG. 9 is a reduced scale, fragmentary, perspective view thereof;

FIG. 10 is a reduced scale, bottom perspective view thereof;

FIG. 11 is a fragmentary, top plane view thereof;

FIG. 13 is an enlarged scale, fragmentary, longitudinal sectional view thereof, taken generally along line 13—13 of FIG. 11;

FIG. 14 is a fragmentary, longitudinal sectional view similar to that of FIG. 12, which illustrates a preferred alternative embodiment of the invention;

DETAILED DESCRIPTION

Figure 12:
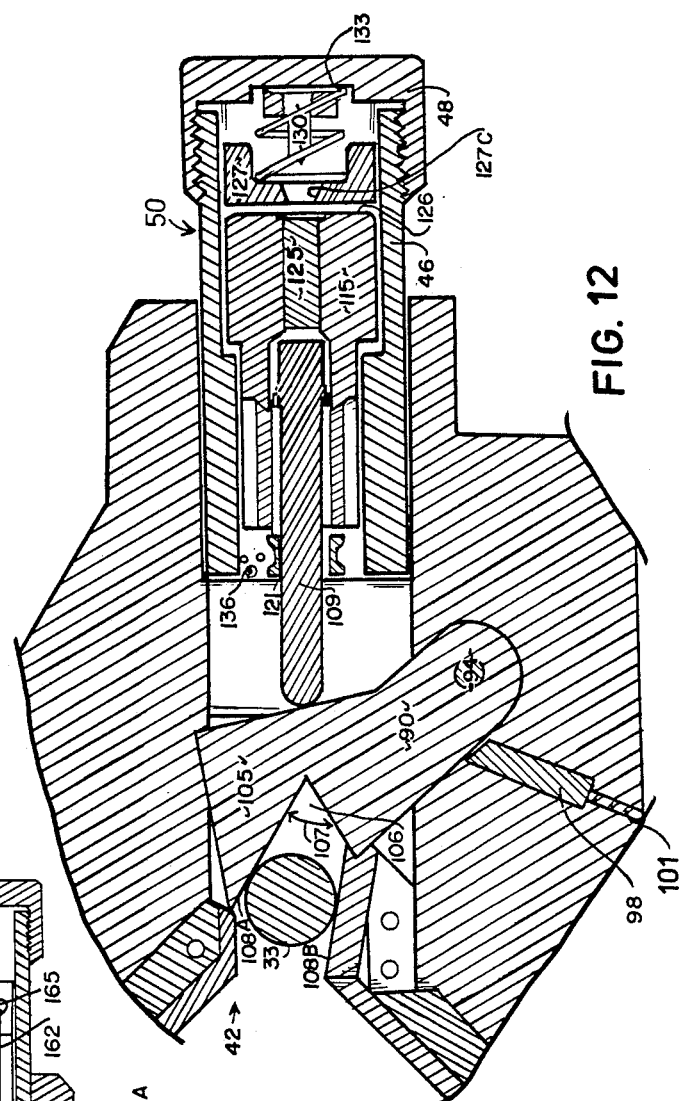
FIG. 12 is an enlarged scale, fragmentary, longitudinal sectional view thereof, taken generally along line 12—12 of FIG. 11.

With initial reference directed now to FIGS. 1 and 2 of the appended drawings, a preferred embodiment of an active cable-cutting apparatus constructed in accordance with the best mode teachings of the present invention has been generally designated by the reference numeral 30. Assembly 30 is ideally adapted to be mounted upon low flying aircraft such as conventional helicopter 32 to encounter and forcibly cut and sever potentially damaging obstructions such as the conventional above-ground cable 33. The apparatus 30 is adapted to be mounted in a variety of selective positions in association with the airframe of the aircraft 32 to protect the aircraft from damage potentially caused by cable collision. It is suitable for either defensive or offensive use against a variety of cable installation, such as conventional power lines, or cables strung for the purpose of impeding and destroying military aircraft. When used offensively, the assembly 30 may be mounted upon an extension bar in front of the aircraft or on an extension cord beneath the aircraft for the purpose of intentionally cutting barrier cables, fences, or wires.

As viewed in FIGS. 2, 6, and 9, assembly 30 comprises a rigid frame, generally designated by the reference numeral 35, consisting of a mounting base portion 38 and an outwardly extending, angular deflection arm 40. The arm 40 and base 38 converge generally at a mouth 42 in which the cable to be destroyed is initially received. Jaw member 44 is integrally associated with a rearwardly extending, hollow, cylindrical housing, or sleeve, generally designated by the reference numeral 46. Sleeve 46 is adapted to secure a variety of mechanical parts which comprise the firing mechanism, broadly designated herein by the reference numeral 50 and described in detail in the paragraphs which follow. Butt portion 48 is preferably removable, and in the best mode it is threaded for screw-fitting to the end of cylindrical sleeve 46. Portion 48 provides a water-tight seal for sleeve 46 and permits the sleeve to be conveniently opened for loading, regular maintenance, and repair.

Frame 35 is machined from light-weight, high strength non-corrosive metal, such as aluminum alloy. In the best mode known at this time it is made from 7075-T651 military grade aluminum alloy. In the future a graphite composite material may be used. The frame preferably comprises a rigid flange 53 which extends approximately one-fourth inch outwardly on either side of the plane defined by frame 35. Flange 53 is provided to enhance the load-bearing capacity and shock resistance of assembly 30, so that assembly 30 does not become unduly strained and bend or warp in response to the forceful impact of a cable strike or the like. With reference to FIGS. 2 and 6, a multiplicity of orifices 57 preferably of graduated sized penetrate deflection arm 40 to decrease the weight of the device, to provide stability, and to decrease wind resistance experienced by aircraft 32 during flight. As best viewed in FIG. 10, adjacent pairs of mounting orifices 59 preferably adapted to receive conventional bolts or fasteners are drilled through flange 53 of base 38 for mounting assembly 30 in any of a number of selective positions upon the body of aircraft 32.

As best viewed in FIG. 2, a rigid, elongated guide blade 62, preferably comprised of hardened steel alloy, extends along the forward edge of base 38. Similarly, guide blade 68 extends along the forward edge of deflection arm 40. Guide blades 62, 68 are secured to frame 35 by multiplicity of conventional, non-corrosive screws 74. The outer edges of guide blades 62, 68 are preferably beveled and are thus adapted to tear and strain the outer periphery or jacket of cable 33 as it slides into engagement with assembly 30 as described in detail below. For improved cutting of heavier cables, the outer edges of guide blades 62, 68 preferably are serrated.

As best viewed in FIGS. 2, 8, 12, and 13, guide blade 62 terminates at mouth 42 in a rigid, angular, cutting block 82 preferably of carbide or hardened steel alloy suitable for providing a tough, sharp, well-defined cutting surface. Block 82 is secured in position adjacent jaw member 44 by conventional screws 84 and is thus adapted to be quickly and conveniently removed from assembly 30 for sharpening or replacement as needed.

As best viewed in FIGS. 12 and 13, jaw member 44 preferably comprises a rigid, angular housing of generally C-shaped configuration adapted to enclose and support within its interior the rigid, notched cutter knife generally designated by the reference numeral 90. Cutter knife 90 is preferably made of hardened steel alloy, and is adapted to pivot within the interior jaw member 44 about pivot pin 94 which transverse jaw member 44 and is secured by bolt 96.

Cutter knife 90 is normally biased to a "ready" position within jaw member 44 by a rigid, preferably spring-biased post 98 which contacts cutter knife 90 at its interior end. Post 98 transverses jaw member 44 and is adjustably anchored upon spring 101 by a set screw countersunk within adjustment orifice 102 defined within flange 53 (FIG. 6). The exterior end 105 of cutter knife 90 defines sharpened cutting notch 106. (FIG. 12) Notch 106 is angled between approximately sixty to seventy degrees, as indicated by angle 107 (FIG. 12) and is thus adapted to engage a variety of cables of differing thicknesses typically used in the United States by power supply companies and the like. In the best mode angle 107 is approximately 60 degrees, so that upper knife portion 105 is dynamically oriented to capture cable 33 for forcible shearing action, avoiding repelling or squeezing cable 33 out of mouth 42. In shearing a cable, the knife 90 dynamically emulates a scissors-like motion relative to the cutting block 82.

With additional reference directed now to FIGS. 3, 6, 12, and 13, the explosive firing mechanism 50 comprises a rigid, generally tubular combustion chamber housing 110 having a head 115B integral and concentric with a reduced diameter, longer sleeve portion 115A. A rigid, elongated piston 109 is coaxially secured within housing 110 for relative axial displacement relative to portions 115A and 115B. The piston includes an inner end 112, a working end 118 for contacting the cutting knife, and a piston ring 113 all disposed within cylindrical sleeve 46. Piston 109 operationally axially transverse housing 110 through internal concentric, passageway 121 and is secured in position by a flexible stop ring 123. Stop ring 123 facilitates direct axial movement of piston 109 and functions to limit deflection thereof during firing. Piston 109 firmly abuts cutter knife 90 to operatively limit movement of cutter knife 90 within jaw member 44 under normal ready-to-fire conditions.

Hollow combustion chamber portion 115B interiorly defines a piston cavity 116 to accomodate piston 109. Piston cavity 116 terminates at shoulder 120 which defines the mouth of the reduced diameter, concentrical throat 124 (FIG. 13). Throat 124 is adapted to concentrically house a conventional explosive power load 125 such as those used in naval riveting or fastening operations which typically bear Navy stock number N55452-7235-0683 or federal specification number GGG-D-777b. SHoulder 120 operatively abuts face 126 of chamber 115 (FIGS. 6, 12). Four elongated gas release grooves 119 are radially spaced about combustion chamber housing portion 115A to vent gases produced by explosion of power load 125 after appropriate piston travel as described below.

Firing mechanism 50 comprises a firing pin system, broadly designated by the reference numeral 129 (FIG. 6) which is dynamically rammed by combustion chamber housing 110 during the firing operation. When this occurs, a resultant explosion forces piston 109 outwardly axially from housing 110 into forcible contact with the cutting knife 90. The generally cylindrical firing pin retainer 127 terminates in peripheral shoulder 128 and is housed generally within the periphery of butt 48, in generally covering relationship with respect to the stationary firing pin 130 concentrically fastened interiorly of butt 48. A generally circular, chamfered opening 127C communicates through the center of retainer 127 to provide a suitable passageway for firing pin 130. The outlet of opening 127C (as viewed in FIG. 6) is thus preferably of a diameter only slightly greater than the outer diameter of firing pin 130. The interior chamfered end of the firing pin retainer 127 (FIG. 12) dynamically centers the pin as the retainer 127 is forced rearwardly (as viewed in FIG. 12) by the combustion chamber housing 110.

Butt portion 48 comprises a rigid cap, the interior periphery of which preferably is threaded to be removably mounted upon the end 46 of assembly 30. Removal of butt portion 48 permits quick and convenient access to the interior for the purpose of replacing the power piston or servicing the apparatus. Such maintenance is required only infrequently, since the charge of a standard power load generally endures three to four years. Thus, general cleaning and inspection of the assembly would presumably require less than one hour per year.

In operation assembly 30 is first appropriately mounted upon or associated with the airframe of an aircraft 32 where it may be likely to encounter a cable. In the positions illustrated in FIG. 1, the curved airframe surfaces of the helicopter tend to guide an impacted cable toward the cable cutters, so as to effectuate maximal protection. As a cable 33 initially enters the assembly, it is guided inwardly toward mouth 42 along the sharpened edges of guide blades 62, 68 and is thereby significantly weakened prior to admission into mouth 42. The outer periphery of the cable will thus experience a measurable amount of strain and tearing along these surfaces before it is forced into engagement with jaw member 44. Cables of smaller diameter and lighter material will generally be severed during this preliminary contact with guide blades 62, 68.

As movement of the aircraft relative to the cable continues, cable 33 is forced into contact with the forward portion 105 of cutter knife 90. Impact upon knife 90 forces it to pivot and strike piston 109. Piston 109 is thus driven backward and impacts shoulder 120 forcing housing 110 to successively ram retainer 127 and compress retainer spring 133. Thereupon, pin 130 is exposed through chamfered opening 127C to be impacted by and explode power load 125. The function of chamfered opening 127C is similar to that of forcing cones of a conventional revolver, in that is assures proper alignment of firing pin 130 with power load 125. The force of the explosion and the gases produced thereby rapidly drives piston 109 axially forward to forcibly impact knife 90. Substantially concurrent forward axial thrust of housing 110 is restrained by internal flange 46D of sleeve 46. The force of explosion and impact drives piston 109 forward into forcible engagement with upper portion 105 of cutter knife 90. As the piston moves axially within housing 110, gas release grooves 119 are exposed, venting gas through their length and through external orifices 136 defined in sleeve 46, thereby permitting escaped gases to be released into the atmosphere to prevent damage or destruction of the assembly.

Cutter knife 90 is driven downwardly into association with cutting block 82 to effectuate a cut, as best viewed in FIG. 13. The cable cut is thus accomplished by the shearing action which occurs as cutter knife 90 slices into scissor-like engagement with the face of cutting block 82.

Once the cable cut is thus effectuated, the force of impact from cable 33 is dissipated, and cutter knife 90 is forced by spring-biased post 98 to return to its upright, non-operative position, and simultaneously pushes the now expended power piston 109 back into the interior of chamber 115. The device is then effectively disabled until a new power load 125 is installed.

The preferred commercial embodiment of assembly 30 is adapted to effectuate a fire under normal conditions by engagement with a cable exerting approximately 20 foot-pounds of force. The cutter is proven to be effective at airspeeds between 5 knots and 170 knots. The typical 20 ft-lb force requirement provides an inherent safety mechanism, since the 20 ft-lb force required to effectuate a fire is greater than the force which could typically be achieved by insertion of a foreign object such as a tool or a workman's finger. Substantial effort would be required to force an accidental fire of the device. Thus, regular inspection, maintenance, and repair of the device can be safely and conveniently conducted without substantial danger. The force requirement, however, may be successfully adjusted by manipulation of the tension set on retainer spring 133 to as low as five foot-pounds to satisfy special military requirements as, for example, for use in low-speed, tactical NOE flight.

While some research indicates that most accidents result from strikes with a single cable, it is my experience that conventional power cables are typically grouped and the danger of encountering multiple cables is rather substantial. Moreover, in a typical warfare situation, multiple sabotage cables will be hidden from view in order to effectively ground and destroy a military aircraft.

Figure 15:
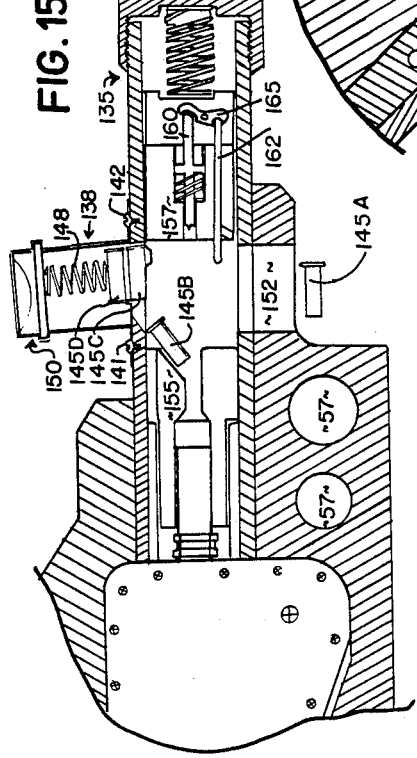
FIG. 15 is a reduced scale, fragmentary, sectional view of a preferred alternative embodiment of FIG. 14, in which portions thereof have been omitted for clarity.
Figure 16:
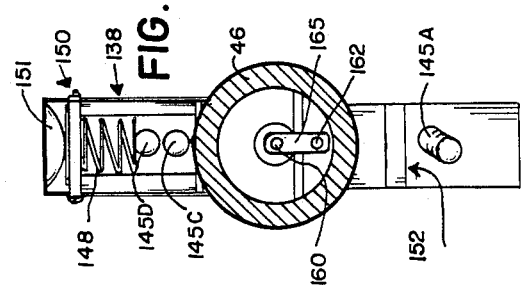
FIG. 16 is a fragmentary sectional view of the preferred alternative embodiment of FIG. 14, taken generally along lines 16—16 of FIG. 14; and, FIG. 17 is a pictorial view of further alternative embodiment of the device illustrating an optional rearward wing portion.

Thus, the preferred alternative embodiment of the invention illustrated in FIGS. 14, 15, and 16 includes an elongated sleeve 135 to support a cartridge magazine 138. Interior throat 140 is also elongated and adapted to operatively receive standard explosive expendable cartridges 145 instead of the power load 125 of the first embodiment described above. Magazine 138 is secured in position upon the surface of sleeve 135 by a pair of set screws 141, 142. Conventional firing cartridges such as those designated by the reference numerals 145A, 145B, 145C, and 145D (FIGS. 14, 15) are loaded within magazine 138 and secured in position for automatic reloading upon feed spring 147 by cap 150. Cap 150 is preferably removably mounted to facilitate reloading of magazine 138. A disk spring 151 operatively associated with cap 150 retains cartridges 145 within magazine 138. Ejection chamber 152 is operatively associated with magazine 138 and penetrates frame 35 to permit ejection of the expended cartridge shells.

The firing mechanism of the alternative embodiment comprises an axially movable combustion chamber 155 operatively associated with firing assembly housing 157. Spring-biased firing pin 160 is retained in position for axial movement relative to housing 157. Impact arm 162 contacts housing 157 at one end and is operatively connected at its opposite end to rocker carriage 165. In operation, cable 33 forces cutter head 90 into engagement with piston 109, ramming housing 115 backward into contact with impact arm 162. Impact arm 162 forcibly pivots rocker carriage 165 and drives firing pin 160 into engagement with the explosive cartridge 145.

The first cartridge 145A is thus fired upon forcible contact with firing pin 160. As piston 109 rams forward upon fire, the expended cartridge 145A is forced out and drops into ejection chamber 152 to be expelled from the device. Simultaneously, housing 157 is forced backward as it clears magazine 138 and a new cartridge 145B is forced into the bottom lip by feed spring 148. After the mechanism has bottomed out, the return spring pushes it forward and pushes shell 145B out of magazine 138. Angular shoulder 168 of sleeve 135 engages the front of the following cartridge 145B as it advances forward and, by the combined forces of its forward thrust and gravity, shoulder 168 guides cartridge 145B into the loaded position for the subsequent fire. As piston 109 is then forced backwardly by impact with a second cable, cartridge 145B is engaged in position upon firing pin 160 for refire. Similarly, as subsequent fires are effectuated, the remaining shells will be ejected from the system.

The described automatic reset and reload function is effective to protect the aircraft from multiple cable strikes. Thus, if the aircraft frees itself from a cable and immediately encounters a second cable, the second cable will be engaged in the assembly and severed as well. This is particularly desirable for tactical or military operations where multiple cables would typically be encountered, or where the assembly is used offensively to destroy fences or similar wire barriers.

Additionally, the system is adapted to fire several times in rapid succession in the event a particular cable is not severed upon the first engagement of the cutter knife. Although the device has been proven through extensive experimentation to be effective to destroy most conventional power lines and cables, it is conceivable that heavier cables may be encountered, for example, in military sabotage operations.

With reference now directed to FIG. 17, a further alternative embodiment of the device is adapted to be attached to an extension rod or cable to be extended in front of the airframe or to carried along at ground level beneath the airframe. THe function of this alternative embodiment is primarily offensive. A rigid, planar air deflection wing 180 of generally triangular configuration is adapted to be selectively, removably mounted upon framework 35 behind jaw member 44. When assembly 30 is mounted upon a rigid extension pole to extend in front of the aircraft for wire-cutting and barrier removal, wing 180 provides aerodynamic stability for the assembly. When the assembly is mounted upon an extension cable and dragged beneath the airframe, wing 180 provides stability as well as additional protection from entanglement with or damage from foliage or other similar low-lying barriers. For purposes of safety, the extension pole is preferably provided with a quick-release mechanism, to assure its release from the aircraft frame if the assembly should become entangled in ground-level barriers.

From the foregoing, it will be seen that this invention is one well adapted to obtain all the ends and objects herein set forth, together with other advantages which are inherent to the structure.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An active cable-cutting assembly for use with an aircraft such as a helicopter or the like for severing one or more obstructive cables, said assembly comprising:
   frame means for securing said assembly to said aircraft;
   jaw means operatively defined by said frame means for initially encountering a cable to be destroyed and guiding it toward a central mouth;
   knife means operationally secured within said jaw means adjacent said mouth for forcing a cable to be cut against stationary cutter block means for severing said cable; and,
   firing means for forcing said knife means toward said cutter block means with said cable sandwiched therebetween, said firing means responsive to forces initially applied by said cable, upon said knife means as said cable is received within said mouth.

2. The assembly as defined in claim 1 wherein said firing means is disposed within a housing associated with said frame, said firing means comprising:
   piston means for forcibly driving said knife means into engagement with a cable to be thereby severed;
   combustion chamber means for housing said piston means, said combustion chamber means axially displaceable interiorly of said sleeve;
   explosive load means disposed within said chamber means for firing said piston means; and,
   firing pin means for forcibly exploding said power load means in response to initial movement of said chamber means.

3. The assembly as defined in claim 2 wherein said combustion chamber housing means comprises groove means for venting gases when said piston moves to a predetermined position.

4. The assembly as defined in claim 1 wherein said firing means is disposed within a sleeve-like housing associated with said frame, said firing means comprising:
   piston means for forcibly driving said knife means into engagement with a cable to be thereby severed;
   combustion chamber means for housing said piston means, said combustion chamber means axially displaceable interiorly of said sleeve;
   explosive load means disposed within said chamber means for firing said piston means; and,
   firing pin means for forcibly exploding said load means for response to initial movement of said chamber means toward said firing pin means after initial cable contact with said knife means drives said piston means toward said firing pin means within said chamber means.

5. The assembly as defined in claim 4 wherein said combustion chamber housing means locates said load means between said piston means and said firing pin means, and comprises groove means for venting gases when said piston moves to a predetermined position after detonation of said load means.

6. The assembly as defined in claim 5 wherein said load means is protected against physical contact by said piston means by travel limiting shoulder means defined interiorly of said chamber means.

7. The assembly as defined in claim 4 including firing pin retaining means for dynamically aligning said pin and said combustion chamber means to insure firing pin contact with said explosive load means.

8. The assembly as defined in claim 4 including adjustable spring means for normally biasing said knife means in a cable receptive position.

9. The assembly as defined in claim 1 wherein said firing means includes magazine means for storing a multiplicity of firing cartridges to be successively fired to effectuate multiple cuts.

10. The assembly as defined in claim 1 wherein said firing means includes magazine means for storing a plurality of explosive cartridges whereby to provide automatic reload for rapid-fire succession of cuts to sever heavier cables, and ejection chamber means for automatically removing the shells of said cartridges from said assembly after firing.

11. The assembly as defined in claim 10, wherein said firing mechanism means includes spring-biased post means for operatively supporting said piston, and means for adjustably setting tension of said spring to permit firing in response to an impact force of as low as five foot-pounds.

12. An active cable-cutting assembly for use with a helicopter, low speed aircraft, or the like for explosively shearing cables, said assembly comprising:
   frame means adapted to be secured to or by said aircraft for initially encountering said cable, said frame means comprising angular deflection arm means for directing said cable into a mouth of said assembly;
   said angular deflection arms comprising a pair of cutting guide blades for initially tearing and straining the outer periphery of a cable;
   jaw means operatively associated with said frame means for capturing a cable to be sheared;
   cutter knife means operationally pivotally secured within said jaw means for forcing a cable to be cut against stationary cutter block means to sever said cable; and,
   firing means for forcibly pivoting said cutter knife means toward said cutter block means to cut said cable sandwiched therebetween, said firing means responsive to forces initially applied by said cable upon said knife means as said cable is received within said jaw means.

13. The assembly as defined in claim 12 wherein said firing means comprises:
   axially movable combustion chamber means for housing an explosive power load;
   piston means in contact with said cutter knife for deflecting said combustion chamber when said knife is initially contacted by a cable to be cut, said piston means concentrically axially displaceable within said combustion chamber means; and,
   stationary firing pin means for impacting and exploding said power load in response to movement of said combustion chamber means theretoward, whereby said piston means is rapidly forced into impacting engagement with said knife means to actuate said knife means and sever said cable.

14. The assembly as defined in claim 13 including:
   elongated gas release groove means defined in said combustion chamber means for venting gases produced by explosion of said power load in response to predetermined piston movement within said chamber means; and, firing pin retainer means for normally covering said firing pin means and for dynamically aligning said power load and said firing pin means.

15. The assembly as defined in claim 14, wherein said cutting block means and said cutting knife means are adapted to be quickly and conveniently removed for sharpening or replacement.

* * * * *